May 31, 1932.  C. E. REED  1,860,953

ROLLER CUTTER BORING DRILL

Filed March 25, 1929

Inventor
Clarence E. Reed
By Spear, Middleton,
Donaldson & Hall
ATTORNEYS

Patented May 31, 1932

1,860,953

UNITED STATES PATENT OFFICE

CLARENCE E. REED, OF WICHITA, KANSAS, ASSIGNOR TO CHICAGO PNEUMATIC TOOL COMPANY, OF NEW YORK, N. Y., A CORPORATION OF NEW JERSEY

ROLLER CUTTER BORING DRILL

Application filed March 25, 1929. Serial No. 349,773.

The invention is an improvement upon that type of roller boring drill for deep well drilling shown in Letters Patent of the United States of Hughes, No. 979,496, December 27, 1910.

One object of the present invention is to provide a rugged structure, in which the tendency of the sections of the head of the drill to separate from each other under the great pressure of operation, and pounding by direct connected lubricator, will be resisted. I aim also to provide an interlocking connection between the sections of the head which will resist any tendency for one section to slide upon the other.

Other objects of the invention will be clear from the following description taken in connection with the accompanying drawings, in which.

Figure 1:
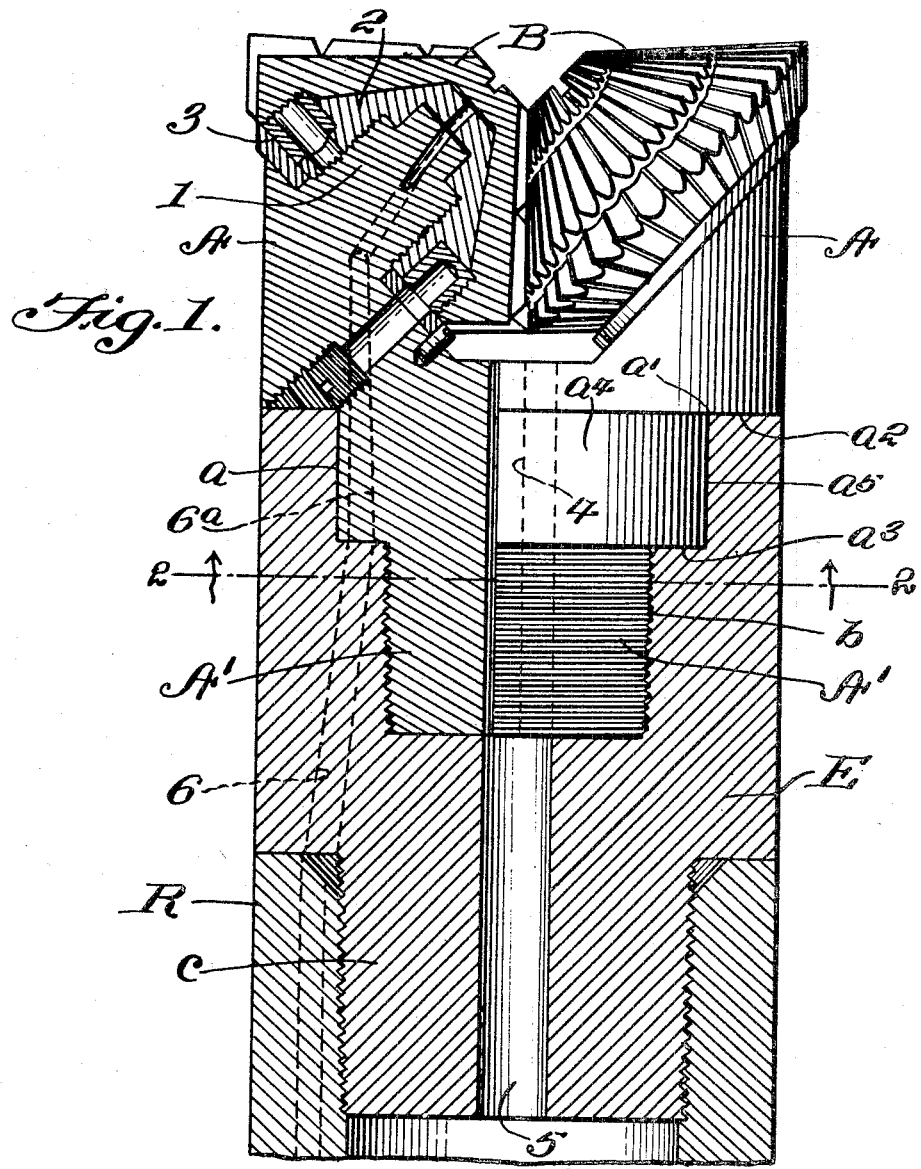
Figure 1 is a central vertical section through a roller cutter drill organization embodying my invention.
Figure 2:
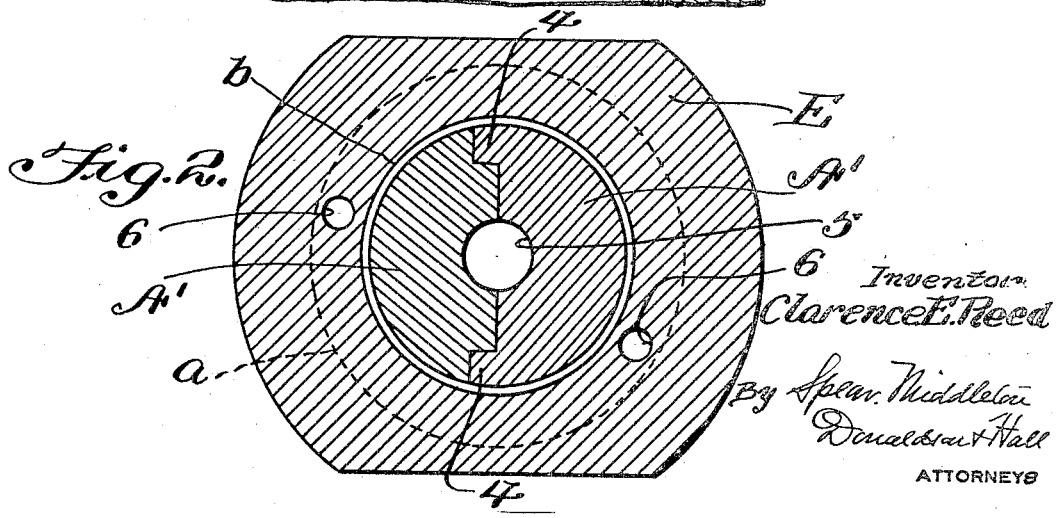
Fig. 2 is a cross sectional view on line 2—2 of Fig. 1.

In these drawings A, A indicate the sections of the drill head of the Hughes patent, each of which carries a frusto-conical roller cutter B, mounted on a spindle 1 integral with the section. 2 indicates the removable portion of the spindle or what may be termed a bushing. This bushing and the means 3 by which the roller cutter is held in place on the spindle may be like similarly designated elements of the Hughes patent.

Each section A of the drill head has a shank portion $A^1$ which is screw threaded. When the two sections A of the head are placed together, their shank portions make up a complete screw threaded shank of circular cross section, which is screwed into a massive chuck member E. This chuck member is of one piece. It is circularly counterbored at $a$ and it has a screw threaded circular socket $b$ adapted to receive the screw threaded shank of the assembled head sections A. The comparatively massive chuck member E has a centrally disposed screw threaded stem $c$. This is in one piece with the main body of the chuck. It is adapted to screw into an operating member which imparts rotary movement to the drill. This member may be the usual heavy drill collar but the established practice is to screw such member into a reamer, such as shown in my pending application No. 176,980, filed March 21, 1927. The letter R designates a part of this reamer.

The composite stem of the head sections A in my organization, together with the circular counterbore and the interlock between these sections, and the drive shoulders $a^2$ and $a^3$, and the massive one piece chuck E interposed between these sections and the operating member, holds the sections A, A securely in place and by its rugged construction this chuck resists any tendency of the sections A, A to be pried apart or loosened under the excessive pressure resulting from the drill working on the bottom of the hole. It will be noted that the sections A are shouldered or notched at $a^1$ to fit the counterbore of the chuck E and to find a bearing at the flat transverse surfaces $a^2$ and $a^3$ at the end of the chuck and the bottom of the counterbore respectively.

This formation provides the sections with a cylindrical portion $a^4$ intermediate the main body of the bit head A, A and the stem $A'$ which is a reduced extension of the head finding a bearing against the cylindrical side wall $a^5$ of the counterbore.

The two sections A, A of the head are interlocked at their meeting faces. One way of effecting this is to provide projecting portions or ribs 4 on one section to enter complementary recesses in the other section, so that any tendency for one section to move laterally in respect to the other section, i. e., in a plane parallel with the meeting faces, will be resisted. This will prevent wear on the meeting faces and looseness of the sections relative to each other. The two sections thus act as a unit in rotating about the vertical axis of the apparatus.

In prior forms of this type of apparatus, a centrally disposed lubricator has been employed within the hollow drill stem and directly connected to the bit head sections, and necessitates that the conduit or conduits for the flushing fluid must be arranged to one side of the axis at the upper ends of the sections so as to communicate with the annular space surrounding the central lubricator. This requires that the water course or courses must extend at an inclination to the vertical axis of the apparatus in order that the outlet of the water course be anywhere adjacent the working face of cutter, and makes impossible an outlet at the axial center of the apparatus for flushing the frustoconical cutter rollers.

As a result of this inclined disposition of the water course, a cutting away of the wall of said water course or conduit takes place, due to the abrasive effect of material such as sand carried along with the water or flushing fluid. With my improvement the water course 5 extends along the vertical central axis of the chuck and of the sections A, A of the head and emerges centrally of the said head sections and at the meeting faces of the roller cutters. Any suitable form of lubricator may be employed, located in the drill stem above the reamer or operating member, and the conduit for the lubricant is indicated at 6, 6a, said conduit being in part through the chuck and in part through the head section, and registering with conduits through the reamer or operating member.

One important advantage of the present construction is that I avoid the prying out action of the sections A, A upon the comparatively thin drill pipe, or portion C (of Hughes No. 979,496) forming a part thereof, integral or otherwise, by the use of a massive one piece chuck which in my improvement is interposed between the sections A, A and the drill pipe, drill collar, reamer body or other part to which the chuck may be attached.

Another important advantage is to throw the drive on shoulders $a^2$ and $a^3$ instead of on the friction thread shank; another is the elimination of pounding by a direct connected lubricator, which usually comprises a pipe about 22 feet long, sometimes 45 feet; another advantage is a central flushing fluid passageway.

I do not limit my invention to a screw threaded connection as other forms of stem could be used.

It will be observed that the renewable part of the boring tool besides the roller cutters comprises the bushings 2. These take the wear of the cutters. They are readily removable for replacement when worn, like in the patent referred to. The sections A, A of the bit head are permanent members in the sense that they will last indefinitely.

They are readily assembled in the chuck and are securely held together thereby against any tendency to relative displacement when at work. The chuck absorbs any such tendency and prevents it from being transmitted to any part of the structure which would be susceptible to distortion under such tendency. By mounting the sectional bit head in the massive one piece chuck, the sections are held in their prescribed relative positions so that the roller cutters will maintain the gauge of the hole throughout the boring operation irrespective of the depth of the hole.

I claim:

1. In roller cutter boring apparatus for rotary drilling, a bit head made up of sections each carrying a roller cutter, each of said sections having a reduced and stepped extension which jointly form a shouldered stem, the extension beyond the first shoulder of the stem being cylindrical and the second extension beyond the second shoulder being screw threaded, a massive one piece chuck having a recess for receiving said sectional stem with a tight fit, said first shoulder on said stem having a wide flat bearing against the end face of said chuck and said second shoulder abutting the end wall of the counterbore in said chuck which receives the cylindrical part of said sectional stem.

2. In rotary earth boring apparatus, a bit head comprising two sections forming an axial flushing passage and each section carrying a frusto-conical cutter which together cut the entire area of the bottom of the hole, mating extensions upon said sections together forming a stepped attachment stem, a massive one piece chuck having a socket receiving said sectional stem with a tight fit and providing a plurality of broad transverse bearing and drive faces in abutting engagement with the shoulders on said sectional stem, and interfitting rib and socket means on said sections maintaining the same against relative movement in a plane transverse to their longitudinal axis.

3. In rotary earth boring apparatus, a bit head comprising two sections each carrying a frusto-conical cutter, which cutters together cut the entire area of the bottom of the hole, mating extensions upon said sections together forming a stepped attachment stem providing broad transverse shoulders, a massive one-piece chuck having a socket receiving said sectional stem with a tight fit and providing a plurality of broad transverse bearing and drive faces in abutting engagement with said shoulders on said sectional stem, said chuck having a water course in line with the vertical axis of the apparatus and registering with a cooperating axial course in said sectional head, said chuck also having a lubricating conduit extending therethrough at one side of said water course and said head sections having cooperating lubricating conduits extending to said cutters.

In testimony whereof I affix my signature.

CLARENCE E. REED.